Patented Nov. 25, 1941

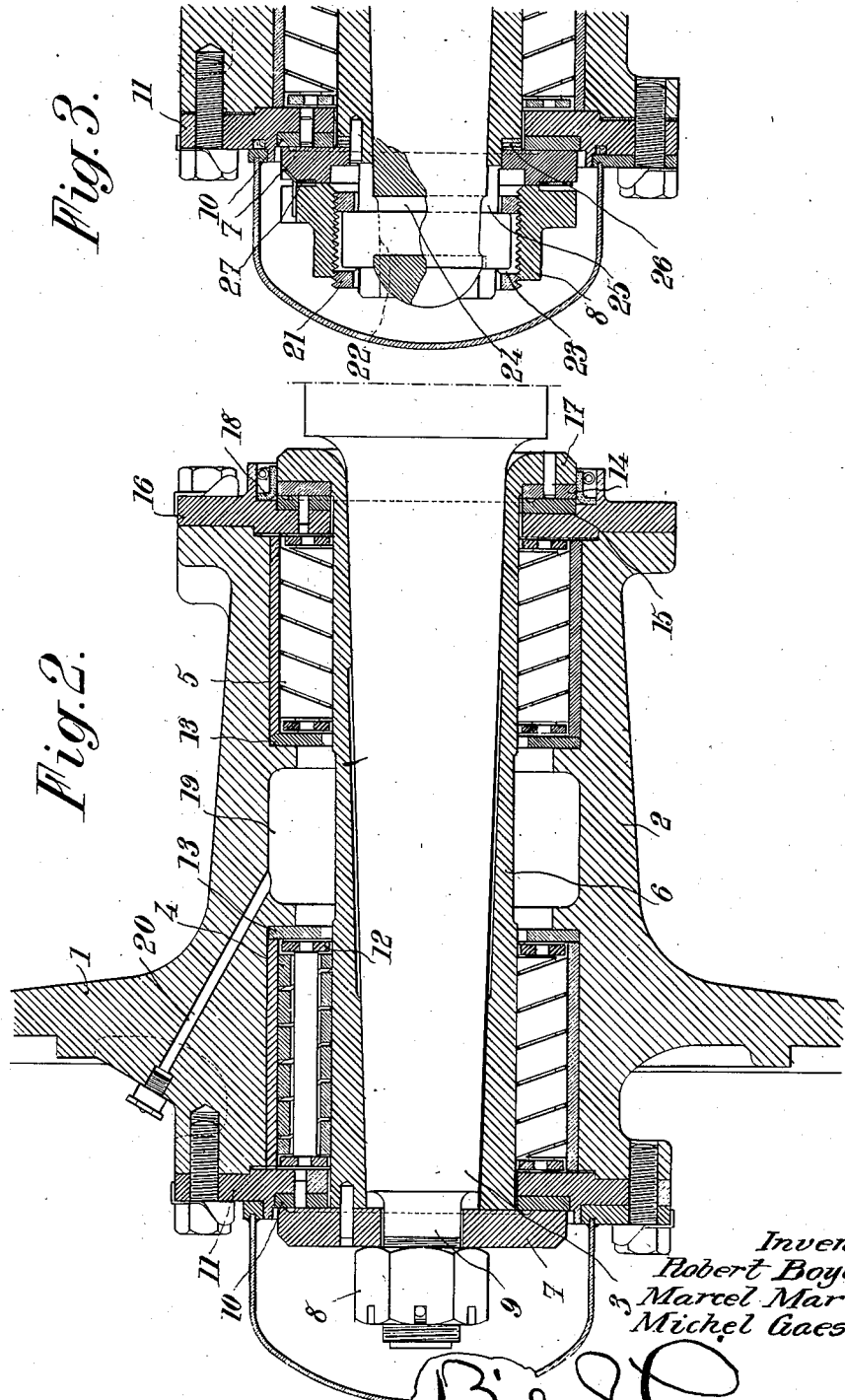

2,263,868

UNITED STATES PATENT OFFICE 2,263,868

WHEEL ARRANGEMENT

Robert Boyer, Paris, Marcel Marin, Neuilly-sur-Seine, and Michel Gaestel, Arcueil, France, assignors to Société "Goodrich" S. A., société anonyme, Bois-Colombes, Seine, France, a society of France Application November 17, 1938, Serial No. 241,070
In Luxemburg November 20, 1937

3 Claims. (Cl. 308—210)

The present invention relates to devices of the kind of wheels, and especially elastic wheels, to be mounted on axles or the like with the interposition of rolling bearings. The invention is more especially although not exclusively, concerned with wheels of this kind including at least two elements connected together by elastic organs under tension, such as rubber rings engaged on pins carried by said two elements, respectively.

The object of the invention is to provide a device of this kind which is better adapted to meet the requirements of practice than similar devices made up to the present time, and, in particular, such that the rotation about the axle elements that support such devices can take place under the best possible conditions of safety and resistance to wear and tear.

According to an essential feature of the present invention, the device includes a hub arranged and combined in such manner to the shaft, axle, or the like, that it is possible to house a bearing substantially in the plane of the efforts due to the load applied to said device, so that said bearing performs a carrying function, whereas at least one other bearing is provided outside of this plane so as to provide a stabilizing function.

According to another feature, the present invention is more especially, although not exclusively, applicable to the case of wheels, and in particular elastic wheels mounted on bearings extending over a substantial length along their axles, for instance juxtaposed multiple bearings. The said bearings are made in the form of elastic elements of a known type so as to be capable of resisting eventual deformations of said axle elements under the combined influence of shocks and speed. Such an arrangement is particularly applicable to wheels for artillery or agricultural vehicles.

According to still another feature of the present invention, which is particularly applicable to axles or trunnions provided with fixation pins, I make use, for clamping the wheel on the trunnion, of means which are located as close as possible to the outer end of the trunnion. These means are, for instance, screwed on a ring through which the fixation pin extends in such manner that the maximum of room is available on the axle for housing the bearings.

The examples and embodiments which will now be described with reference to the drawings relate, in particular, to the case of wheels for vehicles intended to move on grounds of all kinds, such for instance as artillery or agricultural vehicles, although the invention is not in any way limited to such vehicles.

It has been found that the wheels and hubs existing at the present time showed, especially because of the increase of the speeds of said vehicles, premature wear and tear and even breakings due, in particular, to one of the following reasons:

(a) The bearings of the hub were located in defective position with respect to the plane of the stresses to be supported;

(b) The axle trunnions were flexible, as in many cases, they had been calculated for speeds of displacement of the vehicles substantially lower than the speeds at which they were actually employed, and these deformations of the trunnions produced a quick wear and tear of the bearings;

(c) There were defects of adjustment and lubrication inherent in the existing mountings.

The chief object of the present invention is to remedy these drawbacks.

According to an essential feature of the present invention, we provide, in combination with each wheel and preferably but not necessarily, integral therewith, a hub arranged and combined with the corresponding axle journal or trunnion in such manner as to make it possible to fit a bearing (preferably of the roller or needle type) substantially in line with the wheel proper, that is to say located in the plane of the stresses due to the load and to the reactions of the ground.

Other features of the present invention will result from the following detailed description of some specific embodiments thereof.

Preferred embodiments of the present invention will be hereinafter described with reference to the accompanying drawings, given merely by way of example, in which:

Fig. 2 is a transverse sectional view on an enlarged scale, on the line II—II of Fig. 1 of the same elastic wheel;

Fig. 3 is a transverse sectional view similar to Fig. 2 but relating to another embodiment of the clamping means.

Figure 1:
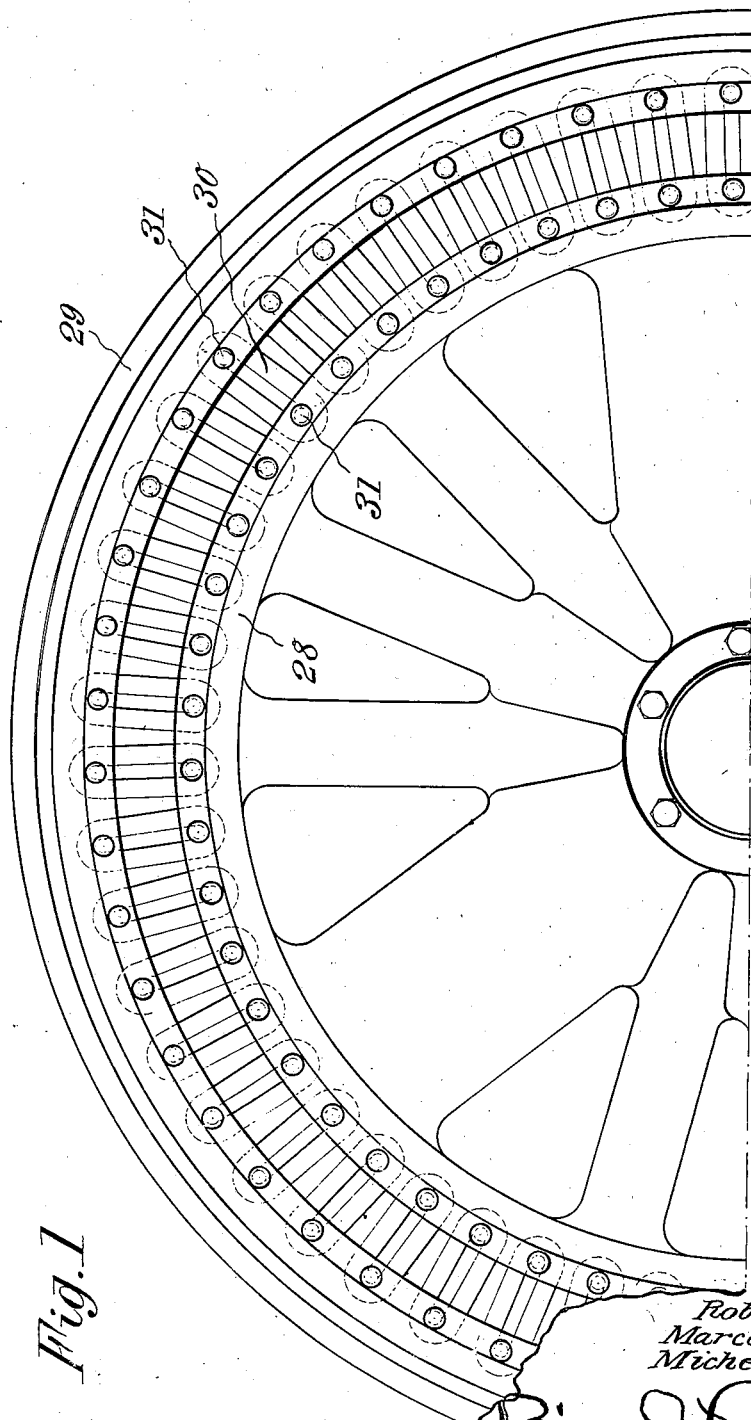
Fig. 1 is a partial elevational view of an elastic wheel made according to the present invention.

For this purpose, for instance, and as shown by Figs. 1 and 2, we make use of a wheel the web (or any equivalent structure) of which, shown at 1, is located close to the end of a hub 2 the length of which corresponds to that of the trunnion or journal 3.

Two bearings 4 and 5 are mounted on the inside of said hub, these bearings being interposed, in any suitable manner, between said hub, and, for instance, a sleeve 6 fitted on the trunnion.

We provide clamping means on the free end of the trunnion, for fixing the whole in position, in such manner that the place occupied by said clamping means, in the direction of the axis of said trunnion, is as small as possible, whereby the outer bearing can be located in the plane of web 1, and even on the outer side of said plane, this bearing 4 then acting as a carrying bearing, whereas the other bearing 5 performs a stabilizing function.

These clamping means consist, for instance, of an outer fixed thrust ring 7 adapted to be clamped against sleeve 6 or a shoulder of said axle journal 3 by a nut 8 screwed against the threaded end 9 thereof. This fixed ring cooperates with a movable thrust ring 10, for instance rigid with an outer flange 11 fixed to the hub.

Such a clamping device leaves behind itself, in the plane of the wheel proper, a space sufficient for housing the first bearing 4 therein.

The two bearings are held in suitable cages shown at 13, with positioning rings 12.

On the side opposed to the free end of the axle trunnion, the parts are axially clamped with one another by any suitable means, such for instance as fixed and movable rings 14 and 15, interposed between an inner flange 16 and a shoulder 17 of sleeve 6, with a gasket 18.

Between the two bearings, there is provided an inner chamber 19, which constitutes a magazine for lubricant fed through a lubricating conduit 20.

According to another arrangement, which applies to trunnions provided with a fixation pin, the clamping means are made as follows:

As shown by Fig. 3, in order to hold the thrust ring 7 above mentioned, we make use of a nut 8 which, in this embodiment, is screwed on a clamping ring 21 mounted in the same plane as fixation pin 22, said ring being provided, for this purpose, with one or several slots 23 for the passage of the pin.

The latter is engaged in an orifice 24 provided in the axle trunnion, sleeve 6 itself being provided with notches 25 for the passage of said pin.

Such an arrangement makes it possible, as does that of Fig. 2, to reduce the volume occupied by the clamping means.

Of course, we may provide rings 26 for adjustment of the lateral play, or any other equivalent means. A brake 27 may further be combined with nut 8.

According to another feature of the present invention, the bearings as above referred to are constituted by elastic rollers, of a type known in itself. With such an arrangement, it is possible to avoid deterioration as it occurs to rigid roller bearings as a consequence of deformations of the axles. Such deformations are considerable on vehicles, such as artillery and agricultural vehicles, which are caused to run, on bad ground, at speeds to which said trunnions are not always adapted. The elastic rollers in question will not be affected by said deformations since they can absorb them owing to their elasticity.

Finally, it is advantageous, especially in the case of the applications which have just been considered, to make use of an elastic type of wheel proper, advantageously that shown by Fig. 1, which includes at least two elements 28, 29, in particular concentric with each other (element 28 being carried by the central portion 1), connected together by means of elastic members such as rubber rings under tension 30 mounted on pins 31 rigid with elements 28, 29, the outer rim element being further advantageously provided with a tire, either of the solid or of the pneumatic type.

Whatever be the particular embodiment that is chosen, the system according to the present invention has over existing wheels and hubs, many advantages, and in particular the following:

It is extremely strong because the bearings do not shown signs of quick wear and tear, owing to the good distribution of the stresses and also of their own elasticity, which is added to that of the wheel.

It permits of easily removing and bringing back into position, the whole of the wheel and the hub, with respect to the axle trunnion or journal.

It ensures a good lubrication in satisfactory conditions, while being very little sensible to lack of care concerning said lubrication.

Finally it permits of easily taking up any play as may occur in the hub.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the accompanying claims.

What we claim is:

1. In a device of the type described, including a wheel having a hub, and an axle, means rotatably mounting said hub on said axle, said means comprising axial guide means preventing relative axial movement only between said hub and axle, and whereby to provide radial play only between said hub and said axle resilient roller bearing means, and recess means mounting said resilient roller bearing means for compression by relative radial movement between said hub and axle, said recess means being so dimensioned with respect to said roller bearing means as to allow at least some free axial movement of said roller bearing means therein.

2. In a device of the type described, including a wheel having a hub member and an axle having a sleeve member thereon, means mounting said hub member on said sleeve member, comprising a pair of spaced, radial flanges on the ends, respectively, of said hub member, a third radial flange rigid with said sleeve member at one end thereof and supported thereby intermediate the ends of said axle, a fourth radial flange removably affixed to the other end of said sleeve member and supported thereby adjacent an end of said axle, the flange on said sleeve member being in axial abutment only with the flanges on said sleeve member whereby to prevent relative axial movement only between said members, and whereby to provide radial play only between said hub and axle, resilient roller bearing means, recess means mounting said resilient roller bearing means between said members in the plane of the load on said wheel for compression by relative radial movement between said members, second resilient roller bearing means, second recess means mounting said second resilient roller bearing means between said members outside of said plane, each of said recess means being so dimensioned with respect to said roller bearing means as to allow at least some free axial movement of said roller bearing means therein, means on said axle engaging said sleeve preventing relative axial movement therebetween in one direction, and nut means operatively engaged on the end of said axle abutting said sleeve and said fourth radial flange preventing relative axial movement therebetween in the other direction.

3. In a device of the type described, including a wheel having a hub and an axle, means rotatably mounting said hub on said axle, said means comprising axial guide means preventing relative axial movement only between said hub and axle, and whereby to provide radial play only between said hub and said axle, resilient roller bearing means, recess means mounting said resilient roller bearing means in the plane of the load on said wheel for compression by relative radial movement between said hub and axle, second resilient roller bearing means, and second recess means mounting said second resilient roller bearing means between said hub and axle outside of said plane, each of said recess means being so dimensioned with respect to said roller bearing means as to allow at least some free axial movement of said roller bearing means therein.

ROBERT BOYER.
MARCEL MARIN.
MICHEL GAESTEL.